(12) United States Patent
Dedlow (10) Patent No.: US 6,405,467 B1
(45) Date of Patent: Jun. 18, 2002

(54) FRAME ASSEMBLY

(76) Inventor: David Dedlow, 1921 Blake Ave., Los Angeles, CA (US) 90039

( * ) Notice: Subject to any disclaimer, the term of this patent is extended or adjusted under 35 U.S.C. 154(b) by 0 days.

(21) Appl. No.: 09/570,830

(22) Filed: May 12, 2000

(51) Int. Cl.[7] ................................................ A47G 1/10
(52) U.S. Cl. ......................... 40/782; 403/402; 403/290
(58) Field of Search .......................... 40/782, 783, 784, 40/FOR 159.1; 403/401, 402, 231, 290

(56) References Cited

U.S. PATENT DOCUMENTS

| | | | | | |
|---|---|---|---|---|---|
| 2,188,209 A | * | 1/1940 | Sharp | ........................ | 403/401 |
| 3,485,519 A | * | 12/1969 | Chiu | ........................ | 403/402 |
| 4,205,470 A | * | 6/1980 | Kapnek | ........................ | 40/155 |
| 4,428,135 A | * | 1/1984 | Sobel | ........................ | 40/155 |
| 4,516,341 A | * | 5/1985 | Jenkins | ........................ | 40/152 |
| 4,610,565 A | * | 9/1986 | Nakayama | ........................ | 403/402 |
| 4,714,373 A | * | 12/1987 | Heekin | ........................ | 403/402 |
| 4,820,077 A | * | 4/1989 | Sawada et al. | ............. | 403/402 |
| 4,833,803 A | * | 5/1989 | Schwartz | ........................ | 40/152 |
| 4,974,352 A | * | 12/1990 | Chen | ........................ | 40/152 |
| 5,419,064 A | * | 5/1995 | Bennett | ........................ | 403/401 |
| 5,647,682 A | * | 7/1997 | Riehm | ........................ | 403/297 |
| 5,799,430 A | * | 9/1998 | Fremstad | ........................ | 40/785 |

* cited by examiner

Primary Examiner—Paul N. Dickson
Assistant Examiner—Bradley King
(74) Attorney, Agent, or Firm—James E. Brunton (57) ABSTRACT

A frame assembly for displaying artwork. The frame assembly has interconnected top, bottom and side frame members and a bottom member connected to the side members to form a precursor article receiving assembly for slidably receiving the artwork. The top frame member is releasably interconnected with the precursor assembly by a novel, easy-to-use corner joining device which is of a simple construction that can be easily operated without the need for any type of tools.

4 Claims, 6 Drawing Sheets

FRAME ASSEMBLY

BACKGROUND OF THE INVENTION

1. Field of the Invention

The present invention relates generally to frame assemblies. More particularly the invention concerns a multi-sided picture frame for displaying artwork, such as photographs, paintings, drawings and the like which embodies a novel, demountable corner joining device for joining selected sides of the picture frame.

2. Discussion of the Prior Art

Numerous types of frame constructions have been suggested in the past and various devices for joining the frame members have been proposed. A particularly popular prior art frame construction is known in the industry as a "side-loader". In this type of frame construction, photographs, paintings, drawings and in the like are inserted into the frame while one side of the frame is detached from the remaining sides that make up the frame.

The thrust of the present invention is to provide a "side-loader" type frame construction that embodies a novel corner joining mechanism that simplifies the releasable interconnection of the detachable frame component of the frame from the remaining sides of the frame.

Another type of prior art corner joining mechanism sometimes used in picture frame construction comprises an "L" shaped, stamped steel plate having two set screws that are receivable within threaded holes provided in the plate. This type of connector, which is known generically as a "tapped angle" bracket, is inserted into "C" shaped channels provided in the sides of the frame proximate each of the mitered corner of the frame. With the brackets in position within the corners of the frame, the set screws can be tightened to force the bracket against the top and bottom of the channel thereby locking the corners together. The tapped angle bracket, while being an effective joining device, is somewhat cumbersome to use and undesirably requires the use of hand tools to affix the bracket in position. Additionally, aligning the corners of the frame assembly while simultaneously tightening the setscrews of the bracket can be troublesome and can result in unsightly gaps being formed at the mitered corners.

Another prior art joining device embodies a small lever mechanism having a cam at one end so that when the lever is in a neutral, upraised position the device can be freely inserted into the channel at the corners of the frame. However, when the lever is depressed, the cam lifts the bracket so as to push it against the top and bottom of the channel, thereby locking the frame members in place. This device eliminates the need for tools, but still has certain limitations. For example, the device of a relatively complex construction must be fabricated from thin gauge sheet metal which renders the corner more flexible thereby also increasing the likelihood of cosmetically undesirable gap at the mitered corners. Additionally, when the lever is depressed, the cam has a tendency to dig into the metal frame. Accordingly, repeated use, the areas at which the cams engage become abraded and the device undesirably loses it gripping ability, thereby permitting the corners to accidentally separate.

Still another type of prior art frame assembly uses an injection molded plastic connector that is inserted into the channel of the frame members at each corner of the frame. Once the connector is in position, it is then secured in place by crimping the molding of the aluminum picture frame using a special crimping tool. Unlike the previously mentioned prior art devices, this particular prior art corner securement device permanently joins the frame members together so that if the securement device were to be used on all four corners of a picture frame there would be no way to open the frame to insert the glass, the matting and the artwork as is necessary with a "side loader" type of frame assembly. Therefore, this particular prior art frame assembly was presumably developed exclusively for use in creating corner samples rather than completed frames. For this reason, this particular prior art joining device is believed to be used solely to join together two short lengths of mitered frame so that the assemblage thus formed can be used with a selected piece of artwork to gain an impression of how that particular molding design would look with the selected art sample.

Yet another prior art plastic corner connector known in the prior art is a device that embodies a ramped cam that must be manipulated with the special machine in order to move the cam into a locking position to secure together mitered to pieces of frame. Once again, this device is somewhat cumbersome to use and requires special tooling to operate the ramped cam.

A primary objective of the frame assembly of the present invention is to provide a demountable corner joining device that if of simple construction, overcomes the drawbacks of the prior art devices, is easy to use and can be inexpensively produced.

SUMMARY OF THE INVENTION

It is an object of the present invention to provide a frame assembly for displaying artwork having top, bottom and side frame members in which the bottom member is connected to the side members to form a precursor article receiving assembly for slidably receiving the artwork and in which the top frame member is releasably interconnected with the precursor assembly by a novel, easy-to-use corner joining device.

Another object of the invention is to provide a frame assembly of the aforementioned character in which the corner joining device is of a simple construction and is easily operated without the need for any type of tools.

Another object of the invention is to provide a frame assembly of the character described in the preceding paragraphs in which the corner joining mechanism, when in a locked position, securely interconnects the top frame member to the precursor article receiving assembly in a manner to prevent accidental separation of the top frame member from the article receiving assembly when the artwork is disposed within the frame assembly.

Another object of the invention is to provide a frame assembly of the character described in which the top frame member can be disconnected from the article receiving assembly as many times as may be required without in any way damaging the precursor article receiving assembly.

Another object of the invention is to provide a frame assembly as described in the preceding paragraphs in which the corner joining mechanism is easy to use without the need of hand tools and can be easily and inexpensively manufactured.

In summary, it is an object of the invention is to provide a frame assembly of the character described, in which the corner joining mechanism includes a pair of resiliently deformable legs that are receivable within the "C"-shaped channels of the side frame members and can easily be cammed into engagement therewith by means the of a finger operated, generally wedge shaped lever arm. With the wedge shaped lever in a downward, locked position, the corner joining mechanism is positively secured in position within the side frame members by inwardly extending protuberances forced on the frame member that are received within adjacently disposed latching notches provided in one of the deformable legs. With this novel construction, an attractive, gap-free corner is produced that will withstand substantial forces tending to separate the frame members.

DESCRIPTION OF THE INVENTION

Figure 1:
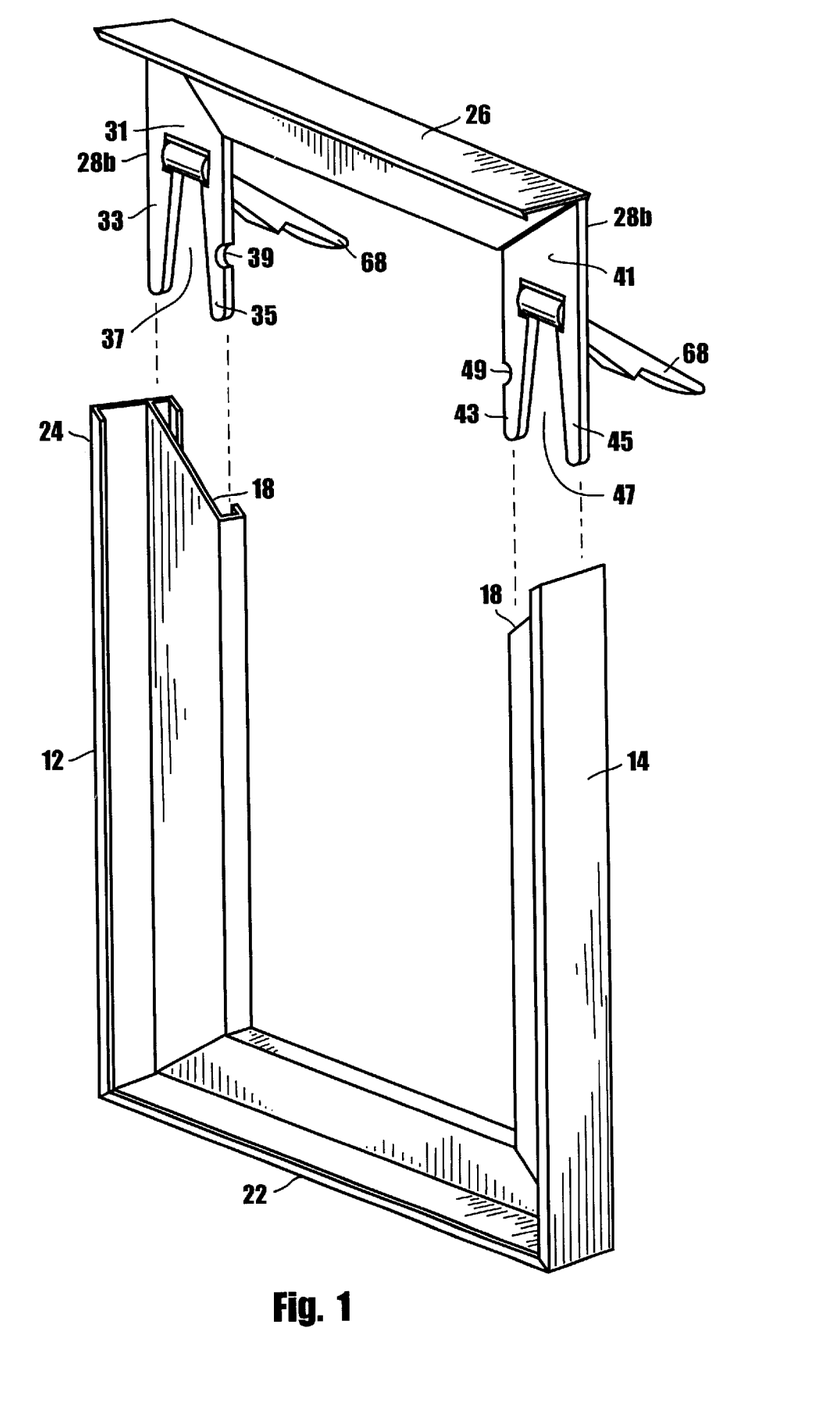
FIG. 1 is a generally perspective, front, exploded view of one embodiment of the picture frame of the present invention.
Figure 2:
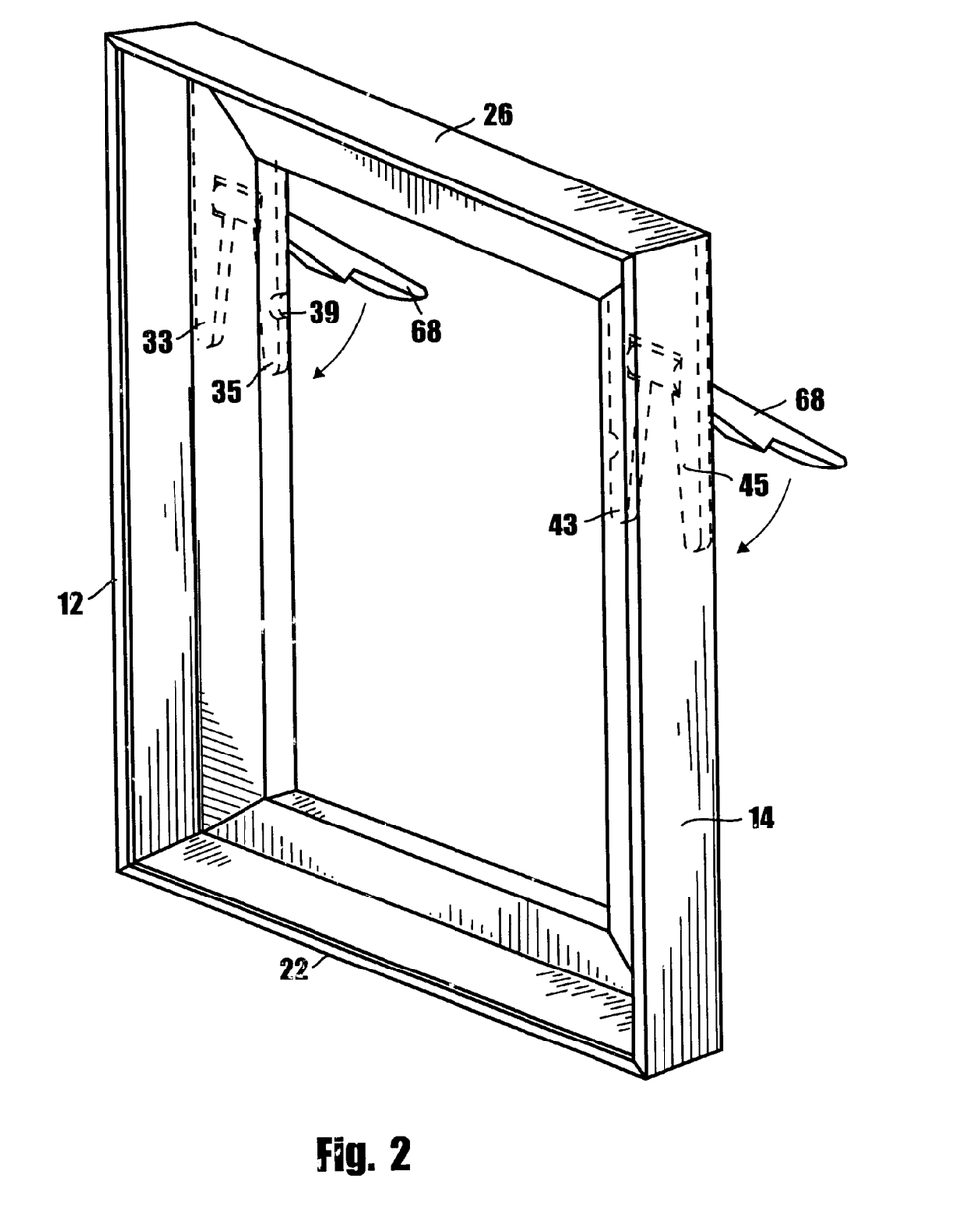
FIG. 2 is a front, perspective view similar to FIG. 1, but showing the top portion of the frame mated with the lower, precursor portion of the frame.
Figure 3:
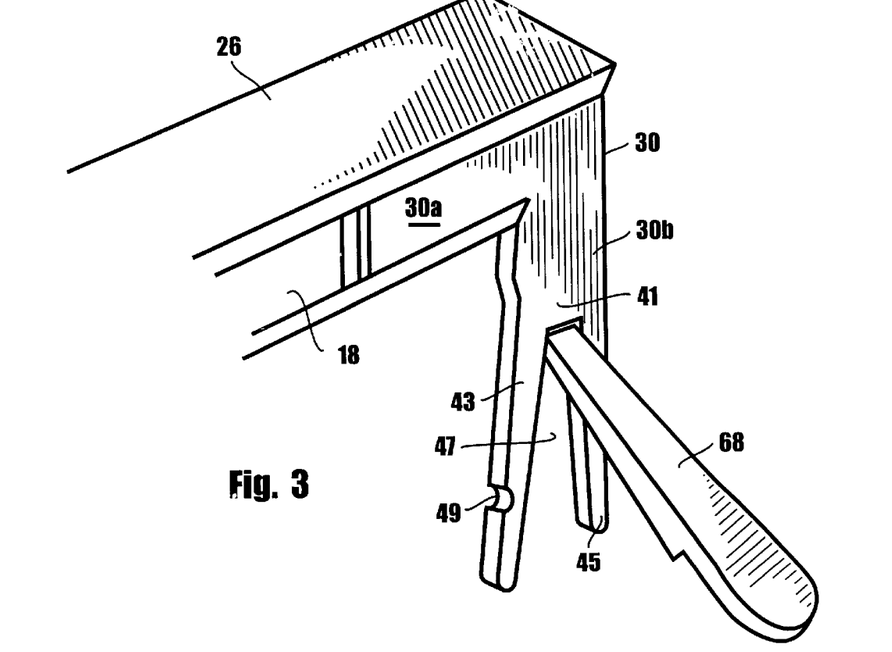
FIG. 3 is a fragmentary, generally perspective view of one of the corners of the top portion of the frame assembly.
Figure 4:
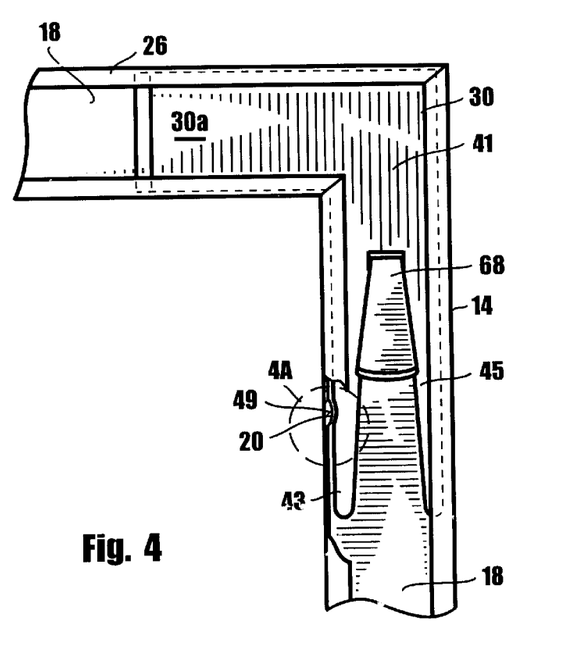
FIG. 4 is a fragmentary, rear plan view of the portion of the frame shown in FIG. 3 that is broken away to show internal construction.
Figure 4A:
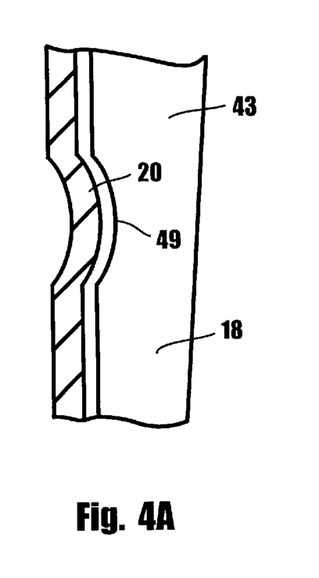
FIG. 4A is a greatly enlarged view of the portion of the frame identified in FIG. 4 as 4A

Referring to the drawings and particularly to FIGS. 1 through 4A, one form of the frame assembly of invention is there shown. This form of the frame assembly comprises first and second spaced apart side members 12 and 14, each having a generally "C" shaped channel 18 formed therein and a protuberance 20 extending into the channel (FIGS. 4 and 4A). Also forming a part of the frame assembly is a bottom member 22 also having a generally "C" shaped channel 18 formed therein. As shown in the drawings, bottom member 22 spans the first and second spaced apart side members and is connected thereto in a manner presently to be described to form a top open precursor frame 24 (FIG. 1). Completing the frame portion of the frame assembly of the invention, is a top member 26 that also has a generally "C" shaped channel 18 formed therein. Comprising an important feature of the apparatus of the invention is connector means for releasably connecting top member 26 to the first and second spaced apart side members 12 and 14 of the precursor frame 24.

In the present form of the invention this novel connector means comprises first and a second generally right angle connector brackets 28 and 30 respectively. As best seen by referring to FIG. 1A, first connector bracket 28 comprises first and second legs 28a and 28b, while connector bracket 30 comprises first and second legs 30a and 30b. Leg 28a of bracket 28 is received within channel 18 of top member 18 and is fixedly connected thereto in a manner presently to be described. Similarly, second leg 28b is received within channel 18 of first side member 12 and is releasably connected thereto by the novel joining means of the invention.

Figure 1A:
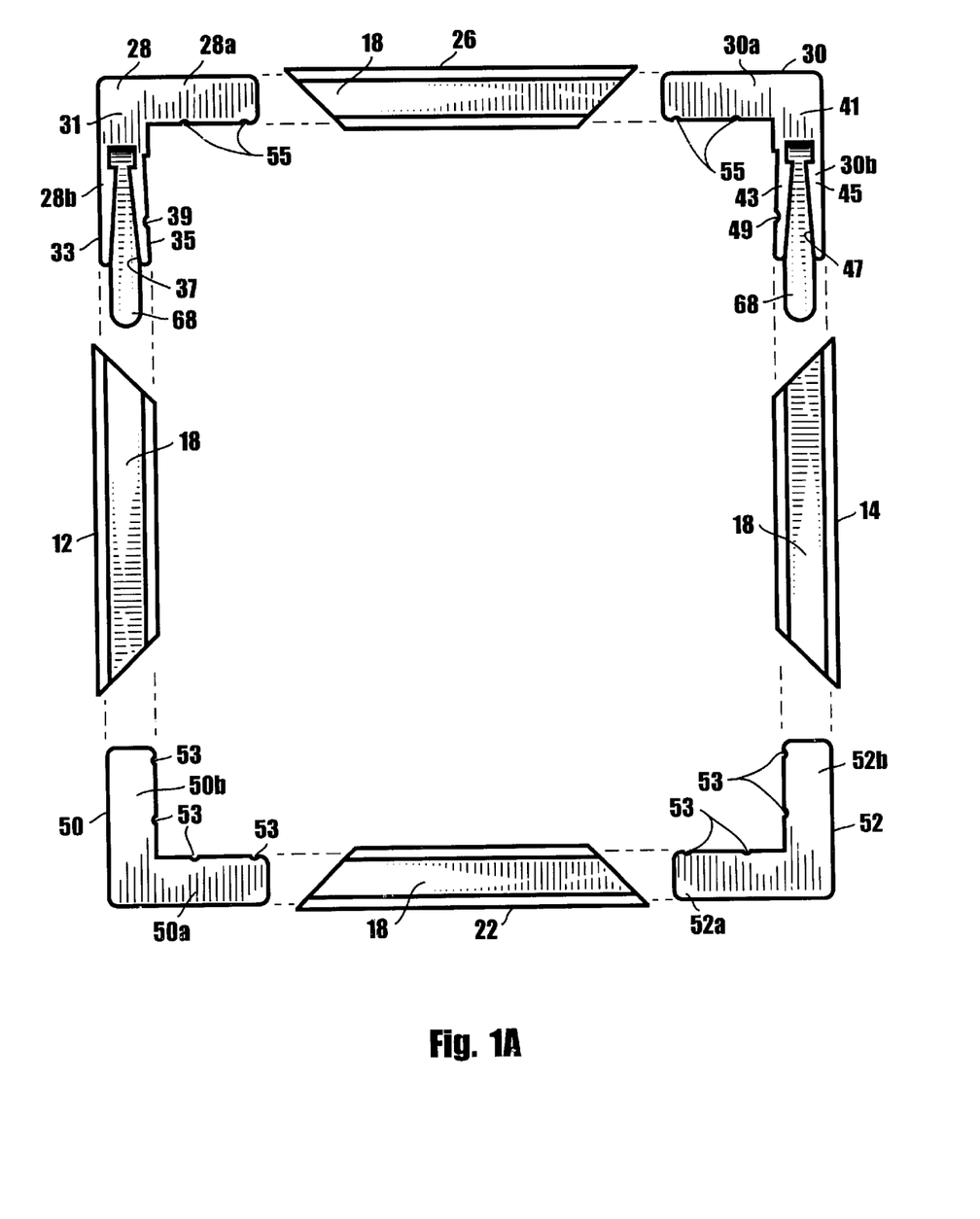
FIG. 1A is an exploded, rear plan view of the picture frame shown in FIG. 1.

Referring to FIGS. 1 and 1A, second leg 28b can be seen to comprise a body portion 31 and first and second spaced-apart segments 33 and 35 that define a generally "V" shaped opening 37 therebetween. Importantly, second segment 35 has a latching notch 39 formed therein within which the previously mentioned protuberance 20 is closely received upon operation of the connector means. Also forming a part of the connector means of the invention is wedge means that is pivotally connected to body portion 31 for urging outward separation of first and second spaced apart segments 33 and 35 to lockably position latching notch 39 over protuberance 20.

Leg 30a of bracket 30 is also received within said channel 18 of top member 18 and is fixedly connected thereto in a manner presently to be described. Similarly, second leg 30b is received within channel 18 of second side member 14 and is releasably connected thereto by the joining means of the invention. As best seen in FIG. 3, second leg 30b comprises a body portion 41 and first and second spaced apart segments 43 and 45 that define a generally "V" shaped opening 47 therebetween. Importantly, first segment 43 has a latching notch 49 formed therein within wedge protuberance 20 of side member 14 is closely received upon operation of the connector means. Also forming a part of connector bracket 30 is wedge means, which is pivotally connected to, said body portion 41 for urging outward separation of said first and second spaced a part segments 43 and 45 to position latching notch 49 over protuberance 20.

The frame assembly of the present form of the invention further comprises precursor frame connector means for connecting bottom member 22 to first and second spaced apart side members 12 and 14. This precursor connector means here comprises first and second crimp connector brackets 50 and 52. Crimp connector bracket 50 comprises comprising a first leg 50a that is receivable with channel 18 of bottom member 22 and a second leg 50b that is receivable within channel 18 of side member 12. Similarly, second crimp connector bracket 52 comprises a first leg 52a that is receivable within channel 18 of bottom member 22 and a second leg 52b that is receivable within channel 18 of second side member 14. As best seen in FIG. 1A, each of the legs of each of the crimp connector brackets 50 and 52 is provided with a pair of spaced apart crimp receiving notches 53. After sliding the legs of the crimp connector brackets into channels 18 of side members 12 and 14 and into channel 18 of base member 22, a commercially available crimping tool is used to two crimp the side members and the bottom member at locations that are indexably aligned with notches 53. This crimping step causes small segments of metal to be urged into the notches 53 so as to securely lock brackets 50 and 52 to side members 12 and 14 and to bottom member 22 to thereby form the precursor frame 24 shown in the lower portion of FIG. 1. Various types of crimping tools to accomplish this crimping operation are commercially available and their construction and operation is well understood by those skilled in the art.

Legs 28a and 30a of brackets 28 and 30 are affixed to top frame member 26 in a manner similar to that described in the preceding paragraph. More particularly, after sliding legs 28a and 30a of the connector brackets into channel 18 of top member 26, a commercially available crimping tool is used to crimp the top member at locations that are indexably aligned with the notches 55 formed in legs 28a and 30a. This crimping step causes small segments of metal from the top frame member 26 to be urged into the notches 55 so as to securely interconnect brackets 28 and 30 with top frame member 26 in the manner shown in FIGS. 1, 3 and 4.

Figure 5:
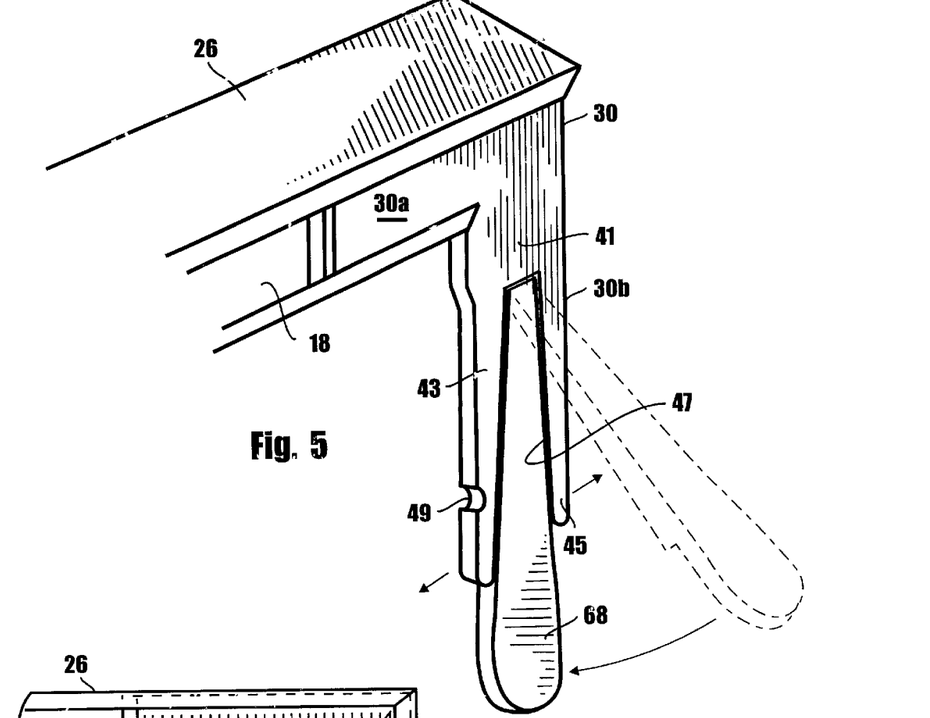
FIG. 5 is a fragmentary, generally perspective rear view similar to FIG. 3, but showing the locking element of the frame moved from the unlocked position shown by the phantom lines to the locked position shown by the solid lines.
Figure 6:
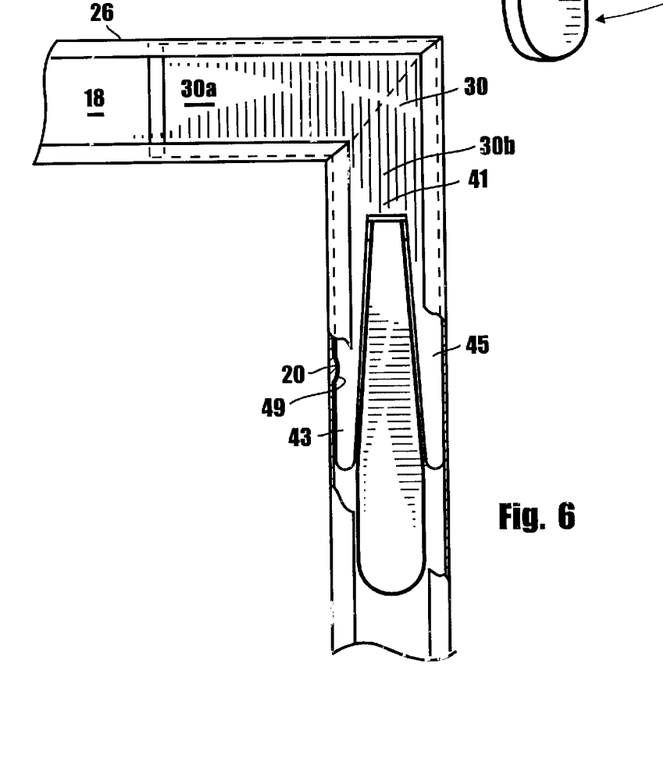
FIG. 6 is a fragmentary, rear plan illustrative view showing the portion of the frame depicted in FIG. 5 mated with the lower, precursor portion of the frame.
Figure 7:
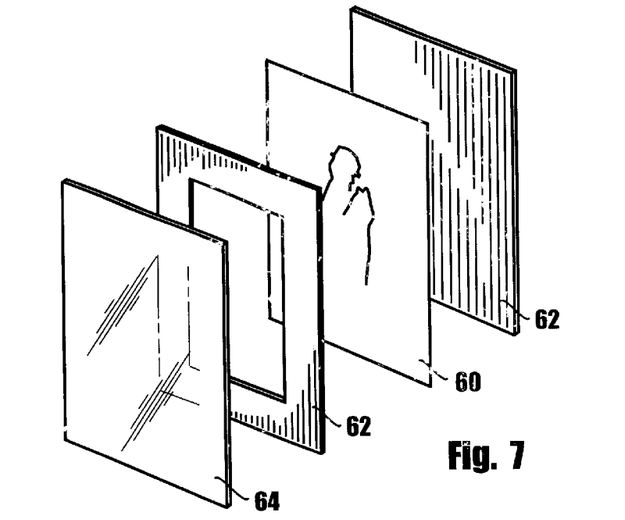
FIG. 7 is a generally perspective view of one form of a picture mounting assembly that is usable with the frame assembly of the invention.
Figure 8:
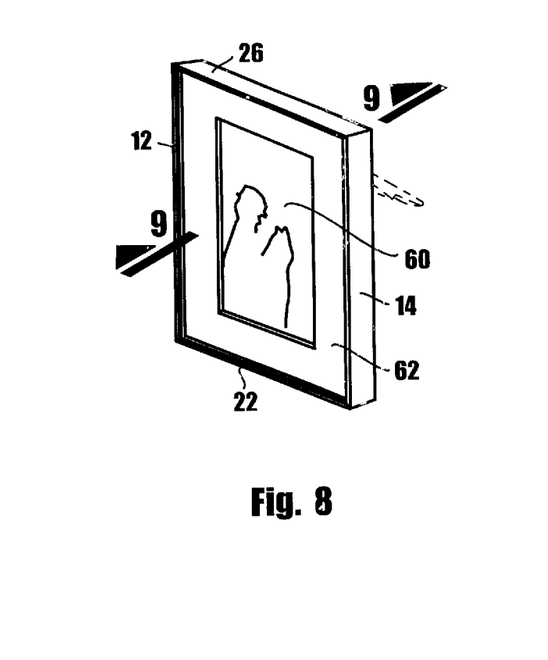
FIG. 8 is a generally perspective view of the frame assembly showing the picture mounting assembly of FIG. 7 mounted therein within.
Figure 9:
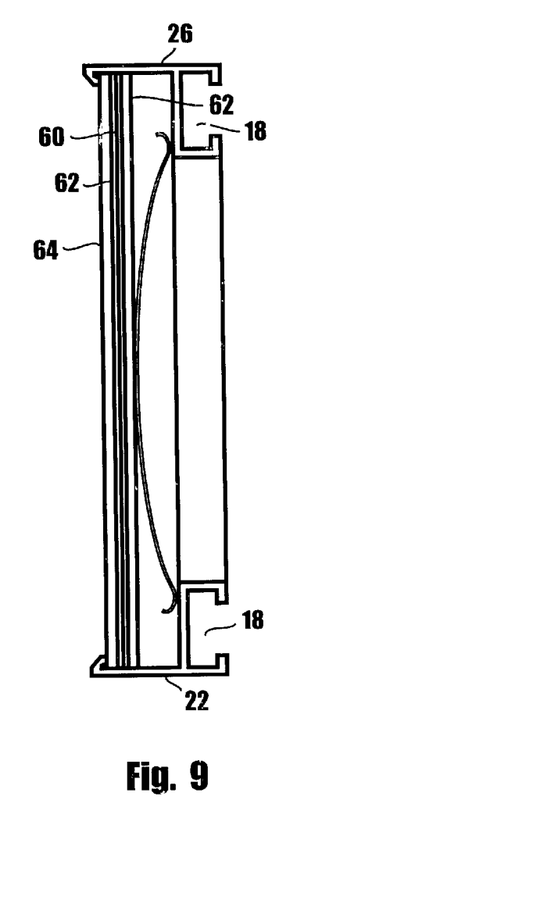
FIG. 9 is an enlarged, cross-sectional view taken along lines 9—9 of FIG. 8.

Following completion of the assembly of precursor frame 24 (FIG. 1), the artwork 60 the matting 62 and the glass 64 shown in FIG. 7 can be slidably inserted into the top open precursor frame 24. This done, the precursor top frame which comprises member 26 and connector brackets 28 and 30 that have been affixed thereto in the manner previously described, can be interconnected with the top open precursor frame 24 to complete the frame assembly. This assembly step is accomplished by first raising the wedge means, which here comprise wedge shaped members 68 to their upraised position shown in FIGS. 1 and 2. With members 58 in this raised position, legs 28b and 30b of the connector brackets can be easily slidably inserted into channels 18 of side members 12 and 14 respectively. When the leg members 28b and 30b are fully inserted into the channels formed in side members 12 and 14, notches 37 well precisely align with protuberances 20 formed in side members 12 and 14 in the manner shown in FIG. 4A and will be slightly spaced apart therefrom. However, a downward force exerted on wedge shaped members 58 will move them into their downward closed position as shown in FIGS. 5 and 6. Because the wedge members are slightly wider than the V-shaped openings 37 and 47, as they move into their closed position within the V-shaped openings they will engage the spaced apart segments of legs 28b and 30b in a manner to force them apart a distance sufficient to cause notches 39 and 49 to be received over and to lockably engage protuberances 20 formed in the side frame members. With the notches in the connector brackets received over protuberances 20, legs 28b and 30b of the connector members will be securely locked in position within side members 12 and 14 and cannot be removed therefrom unless and until the wedge shaded members 58 are once again pivoted into their upraised position as shown in FIGS. 1 and 2. With the top frame member 26 thusly connected to the lower frame precursor assembly 24, the completed frame illustrated in FIGS. 8 and 9 will be produced. Because protuberances 20 of the side frame members are securely captured within notches 39 and 49 of the connector members 28 and 30, the frame can, if desired, be suspended from top frame member 26 without danger of the top frame precursor assembly accidentally separating from the lower frame precursor assembly 24.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A frame assembly comprising:
    (a) first and second spaced apart side members, each said first and second side member having a channel formed therein and a protuberance extending into said channel;
    (b) a bottom member having a channel formed therein, said bottom member spanning said first and second spaced apart side members and being interconnected thereto;
    (c) a top member having a channel formed therein; and
    (d) connector means for releasably connecting said top member to said first and second spaced apart side members, said connector means comprising:
        (i) a first connector bracket having first and second legs, said first leg being connected to said top member and said second leg being releasably connected to said first side member, said second leg comprising a body portion and first and second spaced apart segments defining a generally "V" shaped opening therebetween, said first segment having a latching notch formed therein and wedge means pivotally connected to said body portion for urging separation of said first and second spaced apart segments to position said latching notch over said protuberance, said wedge means comprising a generally wedge shaped member pivotally connected to said body portion of said second leg for movement between a first upraised position and a second downward position in engagement with said first and second spaced-apart segments; and
        (ii) a second connector bracket having first and second legs said first leg being connected to said top member and said second leg being releasably connected to said second side member, said second leg comprising a body portion and first and second spaced apart segments defining a generally "V" shaped opening therebetween, said first segment having a latching notch formed therein and wedge means pivotally connected to said body portion for urging separation of said first and second spaced apart segments to position said latching notch over said protuberance, said wedge means comprising a generally wedge shaped member pivotally connected to said body portion of said second leg for movement between a first upraised position and a second downward position in engagement with said first and second spaced-apart segments.

2. The frame assembly as defined in claim 1 in which said second leg of said first connector bracket is received within said channel of said first side member and in which said second leg of said second connector bracket is received within said channel of said second side member.

3. A frame assembly comprising:
    (a) first and second spaced apart side members, each said first and second side member having a channel formed therein and a protuberance extending into said channel;
    (b) a bottom member having a channel formed therein, said bottom member spanning said first and second spaced apart side members and being connected thereto;
    (c) a top member having a channel formed therein; and
    (d) connector means for releasably connecting said top member to said first and second spaced apart side members, said connector means comprising:
        (i) a first connector bracket comprising:
            a. first and second legs, said first leg being received within said channel of said top member and being connected thereto and said second leg being received with in said channel of said first side member and a being releasably connected thereto, said second leg comprising a body portion and first and second spaced apart segments, said segments defining a generally "V" shaped opening therebetween, said first segment having a latching notch formed therein; and b. wedge means pivotally connected to said body portion for urging separation of said first and second spaced apart segments to position said latching notch over said protuberance, said wedge means comprising a generally wedge-shaped member pivotally connected to said body portion of said second leg for movement between a first upraised position and a second downward position in engagement with said first and second spaced-apart segments; and (ii) a second connector bracket comprising:

a. first and second legs, said first leg being received within said channel of said top member and being connected thereto and said second leg being received within said channel of said second side member and a being releasably connected thereto, said second leg comprising a body portion and first and second spaced apart segments, said segments defining a generally "V" shaped opening therebetween, said first segment having a latching notch formed therein; and   b. wedge means pivotally connected to said body portion for urging separation of said first and second spaced apart segments to position said latching notch over said protuberance, said wedge means comprising a generally wedge-shaped member pivotally connected to said body portion of said second leg for movement between a first upraised position and a second downward position in engagement with said first and second spaced-apart segments.

4. The frame assembly as defined in claim 3 in which said channel formed and said first and second spaced apart side members, said top member and said bottom member is generally "C" shaped in cross-section.

* * * * *